Figure 1:
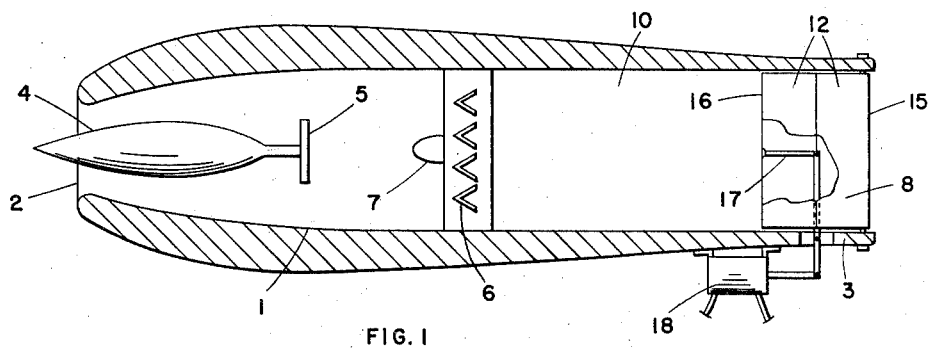

April 16, 1957 F. A. FORD, JR 2,788,635
DEVICE FOR VARYING A JET ENGINE ORIFICE
Filed Oct. 22, 1953

INVENTOR.
FREDERICK A. FORD, JR.

BY *William R Lane*

ATTORNEY

United States Patent Office 2,788,635
Patented Apr. 16, 1957

2,788,635

DEVICE FOR VARYING A JET ENGINE ORIFICE

Frederick A. Ford, Jr., Whittier, Calif., assignor to North American Aviation, Inc.

Application October 22, 1953, Serial No. 387,666

2 Claims. (Cl. 60—35.6)

This invention relates to jet engines and more particularly to a device for varying the area of a jet engine orifice.

Jet engines usually comprise a tubular housing or duct and include therein an intake orifice, a combustion chamber for the burning of fuel, and an exhaust nozzle aft of said combustion chamber having a restricted orifice commonly known as the throat. Conventionally both of these orifices are of fixed cross-sectional area and jet engines so constructed can be designed to operate efficiently only within a limited thrust range. Engines of this type are designed to operate with a particular ratio of airflow to fuel flow, the mixture being burned in the combustion chamber. Addition of fuel to the combustion chamber over and above that necessary to maintain design thrust does not increase the thrust proportional to the amount of fuel added. The engine therefore operates at a marked decrease in efficiency out of the design thrust range because design airflow is not maintained.

It has been found, therefore, that varying the exhaust nozzle throat area enables an engine to maintain the design airflow with an increased fuel flow thereby increasing the engine thrust range. Likewise varying the inlet orifice area produces a more flexible control of the airflow so that it may be adjusted to variable flight conditions. A jet engine having these orifices variable, then, claims the advantages of increased thrust range, increased upper altitude limit of operation, and more efficient variable Mach number flight.

Heretofore, devices proposed for varying the area of these orifices have been complicated in construction and operation and are liable to mechanical failures at high temperatures and high performance. This is particularly true in the case of the devices for varying the throat area of the exhaust nozzle where temperatures are of the order of 3,000° F.

This invention contemplates a simply constructed and operated device for varying the intake and exhaust orifices of a jet engine. The contemplated device has been found particularly applicable, although not restricted, to converging-diverging exhaust nozzles of high performance, i. e., Mach numbers of 1 to 3, because of its desirable geometry.

This invention also contemplates a device which has the abiilty to operate satisfactorily at high temperatures for varying the area of intake and the exhaust orifices of a jet engine.

It is therefore an object of this invention to provide a device for varying the cross-sectional area of an orifice.

Another object of this invention is the provision of a device for varying the throat area of an exhaust nozzle of a jet engine.

Another object of this invention is the provision of a device for varying the cross-sectional area of the intake orifice of a jet engine.

Still another object of this invention is the provision of a device characterized by a mechanical and operational simplicity for varying the cross-sectional area of the orifices of a jet engine.

A further object of this invention is the provision of a device, which has the ability to operate satisfactorily at high temperatures, for varying the cross-sectional area of the intake and the exhaust orifices of a jet engine.

A still further object of this invention is the provision of a device of the geometry suitable for varying the cross-sectional area of the intake and the exhaust orifices of a jet engine of high performance, i. e., flight at Mach numbers 1 to 3.

Figure 2:
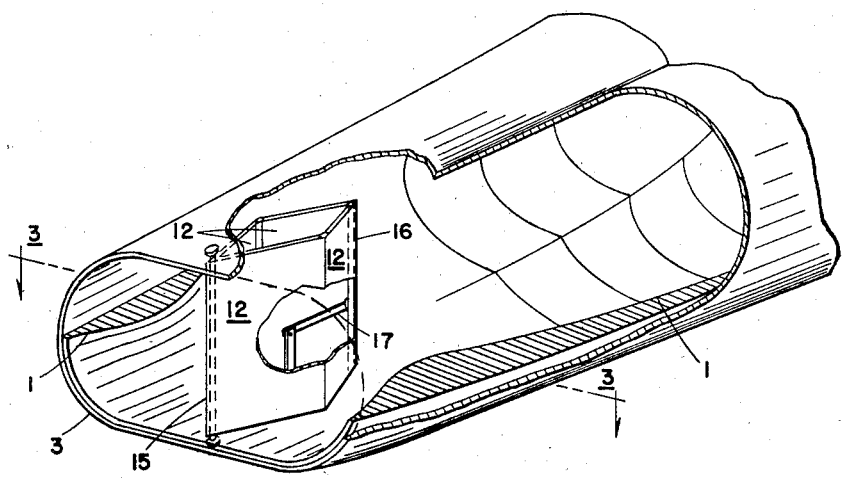
Figure 3:
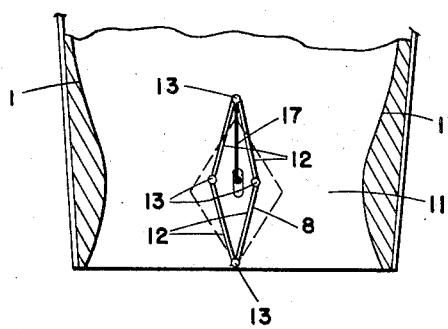

Other objects of invention will become apparent from the following description taken in connection with the accompanying drawings, in which Fig. 1 is semi-schematic, longitudinal sectional view of a jet engine showing the device of this invention mounted in the exhaust nozzle thereof;

Fig. 2 is a perspective view of a common exhaust duct of a twin jet partially broken away to show structure of a variable area exhaust nozzle constructed in accordance with this invention;

And Fig. 3 is a sectional view taken along line 3—3 of Fig. 2.

In detail Fig. 1 shows a conventional ramjet engine comprising a tubular housing or duct 1 having an intake orifice 2 and an exhaust nozzle 3 adapted for gas flow therethrough from orifice 2 to nozzle 3. Mounted internally of duct 1 and partially extending outwardly of intake orifice 2 is shown wedge or conically-shaped island 4 having a rearwardly directed fuel injector 5 extending from its aft end. Although the jet engine illustrated is shown with a fixed area intake orifice, it will be noted that the device to be described for varying the exhaust nozzle throat area can as well be mounted for varying this intake orifice (or a throat near this orifice) in order to accomplish the desirable results previously described.

Secured to duct 1 aft of injector 5 are shown conventional flame stabilizers 6 and igniter 7. Mounted internally of duct 1 at exhaust nozzle 3 thereof is a collapsible box or wedge generally designated 8, to be later described. A portion of duct 1 between flame stabilizers 6 and nozzle 3, in which the majority of fuel burning takes place, is commonly known as the combustion chamber referred to as 10 in Fig. 1.

Combustion chamber 10 is normally of constant diameter, the remainder of duct 1 being restricted at or near intake orifice 2 and at a point of exhaust nozzle 3 known as the throat 11 (Fig. 3).

Wedge 8 is shown in Figs. 2 and 3 as comprising a plurality of vertically disposed plates 12 connected in edge-to-edge relationship as by pivot pins 13 to form a geometrical figure having the cross-section of a parallelogram. Wedge 8 is pictured with the longer dimension of the described parallelogram aligned longitudinally with duct 1, and the shorter diagonal aligned transversely of duct 1 at throat 11. The rearmost pivot 13 extends into the structure of duct 1 at exhaust end 3, thereby fixing rearwardly directed edge 15 to duct 1. The other edges of the parallelogram are free to move with respect to duct 1.

It is obvious that wedge 8, instead of being constructed of stiff, pivotally connected plates, may be formed of a continuous flexible sheet bent to the desired shape with the trailing edge secured to the nozzle as described above and collapsible without the need for pivot pins 13.

Leading edge 16 of wedge 8 is directed opposite the direction of gas flow. Connected to leading edge 16 of wedge 8 is actuating link 17 which is adapted to change the diagonal dimensions of wedge or box 8 upon the forward or rearward movement of link 17. Link 17 may be operated manually through a hydraulic piston 18 and associated linkage 19 or by any automatic control device (not shown).

As best seen in Fig. 3, the rearward movement of link 17 will cause box 8 to be expanded from the position shown in solid lines to the dotted line position, thereby decreasing the net flow cross-sectional area of throat 11. It is also obvious that instead of joining one edge of box 8 to nozzle 3, pins 13 may extend into slots or guides in the structure of nozzle 3, all corners thereby being movable.

Studies have shown that box 8, as pictured in the drawings, is particularly successful in its application to either twin ramjet or turbojet engines for which a common intake or exhaust nozzle exists. The exhaust nozzle configuration shown in Fig. 2 is such as to particularly adapt itself to use with box 8 as constructed in accordance with this invention.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A device for varying the area of a jet engine exhaust nozzle throat comprising a collapsible wedge vertically mounted internally from one edge to the opposite edge of said nozzle throat, said wedge being spaced from the lateral periphery of said nozzle so as to form two parallel flow passages therein, said wedge having a leading edge directed opposite of the direction of the exhaust gas flow and having faces adjacent said leading edge adapted for movement so as to vary the angle there-included, vertical pivot means for so mounting said wedge, and actuating means for causing said movement whereby said movemnet inversely varies the cross-sectional area of said throat.

2. A device for varying the area of a jet engine exhaust nozzle throat designed for fluid flow from a forward direction to an aft direction comprising four plates vertically disposed internally from one edge to the opposite edge of said nozzle throat in contiguous edge-to-edge relationship to form a parallelogram one diagonal of which is aligned longitudinally of said nozzle and the other diagonal of which is aligned across said throat, said plates being spaced in the direction of said other diagonal from the lateral periphery of said nozzle so as to form two parallel flow passages therein, vertical pivot means for connecting adjacent plates in said relationship and for connecting the aft edge of said parallelogram to the structure of said nozzle throat, and a push-pull link connected to the forward edge of said parallelogram whereby the actuation of said link causes the diagonal dimensions of said parallelogram to change thereby varying the cross-sectional area of said throat.

References Cited in the file of this patent

UNITED STATES PATENTS

| | | |
|---|---|---|
| 2,546,673 | Mattix et al. | Mar. 27, 1951 |
| 2,577,405 | Cones | Dec. 4, 1951 |
| 2,593,420 | Diehl | Apr. 22, 1952 |
| 2,641,104 | Estabrook | June 9, 1953 |
| 2,664,700 | Benoit | Jan. 5, 1954 |

FOREIGN PATENTS

| | | |
|---|---|---|
| 789,467 | France | Aug. 19, 1935 |